United States Patent

[11] 3,611,212

[72] Inventors Otmar Ringelhaan Munich-Neuaubing; Siegmund Kreil, Stockdorf, both of Germany

[21] Appl. No. 827,115
[22] Filed May 16, 1969
[45] Patented Oct. 5, 1971
[73] Assignee Siemens Aktiengesellschaft Berlin and Munich, Germany
[32] Priority Aug. 26, 1964
[33] Germany
[31] S 92807
Continuation of application Ser. No. 482,301, Aug. 24, 1965, now abandoned.

[54] BROADBAND FREQUENCY MODULATOR HAVING A NEGLIGIBLE HYSTERESIS, AIR-CORE INDUCTANCE
6 Claims, 3 Drawing Figs.

[52] U.S. Cl. .......... 332/16 T, 331/113
[51] Int. Cl. .......... H03c 3/00
[50] Field of Search .......... 331/113, 114, 117, 159, 144, 145; 332/14, 16

[56] References Cited

UNITED STATES PATENTS

| | | | |
|---|---|---|---|
| 2,297,926 | 10/1942 | Usselman | 332/14 |
| 2,759,104 | 8/1956 | Skellett | 331/113 |
| 2,843,745 | 7/1958 | Smith | 331/113 |
| 2,943,212 | 6/1960 | Hill et al. | 331/113 |
| 3,201,718 | 8/1965 | Trojak | 331/113 |
| 3,238,471 | 3/1966 | Wessels | 331/113 |
| 3,292,106 | 12/1966 | Baldwin | 331/114 |

*Primary Examiner*—John Kominski
*Attorney*—Sherman, Meroni, Gross and Simpson

ABSTRACT: A wide band frequency modulator having an astable multivibrator for the generation of carrier oscillations, the multivibrator comprising two amplifier elements having control and output electrodes crossconnected. A common modulation voltage is applied to each amplifier element. The apparatus also includes a rechargeable storer having an inductance operatively connecting the control electrodes of both amplifier elements. The inductance has a negligible hysteresis and is preferably of the air-core type. A transformer is connected with the output electrodes of the amplifier elements to provide modulated carrier frequency.

INVENTORS

OTMAR RINGELHAAN

SIEGMUND KREIL

BY [signature] ATTORNEYS

BROADBAND FREQUENCY MODULATOR HAVING A NEGLIGIBLE HYSTERESIS, AIR-CORE INDUCTANCE

This is a streamline continuation of Ser. No. 482,301 filed Aug. 24, 1965 and now abandoned.

The invention relates to a wide-band frequency modulator for installations, in electrical signal engineering, especially directional radio engineering.

In modulators of this type, very high requirements must be met both as to the linearity of the modulation characteristic curve and also with respect to freedom from thermal noises as well as intermodulation noises. The realization of these demands presents considerable difficulties in the case of message transmission systems operating with frequency modulation, by reason of the very broad signal frequency bands. Frequency modulators for directional radio systems are known in which the intermediate frequency in the frequency range of about 107 cycles, frequency-modulated with the base band, is obtained by heterdyning the oscillations of two reflex klystrons. These klystrons operate in the range of about $10^9$ cycles of which one is frequency-modulated by the base band. In another known frequency modulator, which is constructed exclusively with semiconductor elements, the modulation is likewise possible only with a conversion in which again use is made of two oscillators differing with respect to their base oscillations by the intermediate frequency. Such oscillators in such case being modulated in push-pull.

Frequency modulators also are known, which, with respect to the modulators described, involve a considerably smaller technical expenditure and in which use is made of an astable multivibrator modulatable in its frequency. They consist essentially of two amplifier elements which, with respect to their control and output electrodes, are coupled crosswise and to whose control grids the modulation voltage is applied. Through special measures, namely, a strong direct-current feedback of the amplifier elements and special limiting means it is possible to make the linearity of the modulation characteristic curve of such a modulator sufficiently great even for relatively wide-band modulation voltages. This holds, however, only for frequencies of the base oscillation of the multivibrator to be modulated below 10 mc. At intermediate frequencies of about 70 mc. such as for example, are generally common in direction radio systems, even high direct-current feedbacks of the amplifier elements and special limiting means can no longer assure a linearity of the modulation characteristic curve in any relatively broad range, because the course of the discharge processes controlling the switching of amplifier elements, by reason of control reactances, is no longer accurate at such high frequencies.

The invention has as its basic problem that of providing for a modulator of the last-mentioned type a solution by which, among other things, the difficulties described, occurring at frequencies in the range of 50 to 200 mc. can be overcome with simple means.

Proceeding from a wide-band frequency modulator for installations, in electrical communications engineering, in particular directional radio technology, making use of an astable multivibrator generating the carrier oscillation, with two amplifier elements coupled crosswise with respect to their control and output electrodes, to whose two control or output electrodes the modulation voltage is effective in like degree, according to the invention the problem is solved by an arrangement in which the multivibrator has an inductance as a rechargeable storer active on the control electrodes of both amplifier elements, with negligible hysteresis, preferably an air-core inductance, which here connects the control and output electrodes of the amplifier elements, preferably directly.

The invention is based on the concept that the mechanics of the recharging operation controlling the switching of the amplifier elements is considerably simplified if, in place of the usual capacitors, there is provided as a rechargeable storer merely a single inductance, which here should have practically no hysteresis.

Furthermore, the preferably direct connection of the control and of the output electrodes of the amplifier elements through the inductance has, among others, the great advantage that the harmful influence of the undesired stray reactances on the operation of the modulator is kept very small.

In a preferred example of construction, the output electrodes of the two amplifier elements are each connected over a respective resistor with the primary winding of an output transformer, to whose center tap there is supplied, over another resistor, the operating direct potential for the amplifier elements. The multivibrator oscillation, modulated in frequency, is obtained on the secondary winding of the output transformer.

Expediently the resistances associated with the output electrodes are of such a value that they largely determine the current flowing in the amplifier elements.

The modulation voltage can, on its part, be supplied in an especially simple manner to the center tap of the primary winding of the output transformer over a coupling device, preferably a low pass. There, the electrodes common to the input and output circuits of the two amplifier elements can be placed on reference potential at least in an alternating current manner.

In another advantageous form of construction embodying the invention there are arranged between the control electrodes of the two amplifier elements two rectifiers, connected in parallel and oppositely poled. Moreover, in this case the inductance representing the rechargeable storer is constructed as a transformer, whose primary winding connects the output electrodes of the two amplifier elements, while the secondary winding thereof, whose center tap preferably is at reference potential, is connected to the control electrodes of the amplifier elements with the end terminals thereof reversed with respect to those of the primary winding. The modulation magnitude in this embodiment is logically supplied in the form of a current to the electrodes common to the input and output circuits of the amplifier elements.

The object of the invention can be achieved extremely advantageously with transistors forming the amplifier elements.

The modulator according to the invention is of particularly simple design if the inductance representing the recharging storer is the primary winding of a transformer, on whose center tap, over a first resistor, there is applied the modulation voltage and, over a second resistor, the operating direct voltage. The frequency-modulated multivibrator oscillation can there be obtained, in the event the output transformer is omitted, at the secondary winding.

With the aid of the examples of construction illustrated in the drawing, the invention will be explained in still further detail in the following. In the drawing, wherein like reference characters indicate like or corresponding parts:

Figure 1:
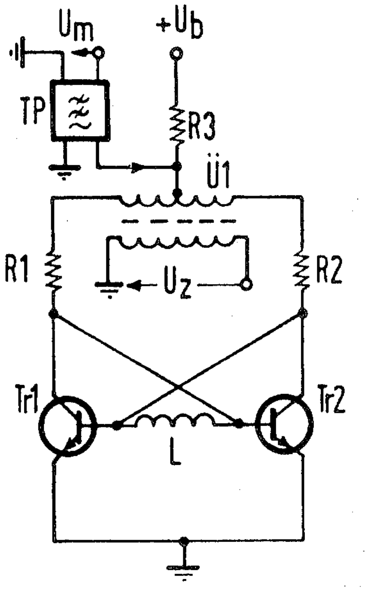
FIG. 1 is a circuit diagram of a frequency modulator embodying the invention.

The wide-band frequency modulator according to the invention, as illustrated in FIG. 1, employs as amplifier elements, two transistors Tr1 and Tr2 which are emitter circuited. Their collector and base electrodes are directly connected crosswise with one another, and between their base electrodes there is disposed an air-core inductance L representing the rechargeable storer. For obtaining the voltage Uz, representing the frequency-modulated oscillation of the multivibrator, as well as for supplying the modulator voltage Um over the lowpass TP, there is provided the output transformer U1, the primary end terminals of which are connected over the resistors R1 and R2 with the collector electrodes and the base electrodes of the respective transistors. The operating voltage +Ub is supplied to the transistors over the resistor R3 and the center tap of the primary winding of the transformer U1. In like manner the modulation voltage also is supplied to such center taps against reference potential. The resistors R1 and R2 are selected large with respect to the saturation resistances of the collector-base junctions of the transistors Tr1 and Tr2. It is thereby achieved that the currents flowing in the transistors in the rhythm of the storage recharging processes in the inductance L are determined practically by these resistances and, thereby, fluctuations of the saturation resistances mentioned are without importance for the properties of the modulator.

As practical tests have shown, the modulator of the invention, with suitable dimensioning of its working points can be controlled for a base frequency of, for example, 70 mc. with a frequency range of $\pm$ 10 mc. and a nonlinearity, of the range thereby utilized of its modulation characteristic curve, of maximally one percent. The circuit basic to these dimensions had the following characteristic values:

R1 = 100 Ω
R2 = 100 Ω
R3 = 75 Ω
L = 200 nHy
Tr ½ = 2 N 2708
Ub = +2.5 V

Besides this surprisingly high linearity the modulator presents, however, also a very great steepness of modulation, which in the experimental circuit mentioned was on the order of 30 to 50 mc./V. Also, it has a very low thermal noise.

Figure 2:
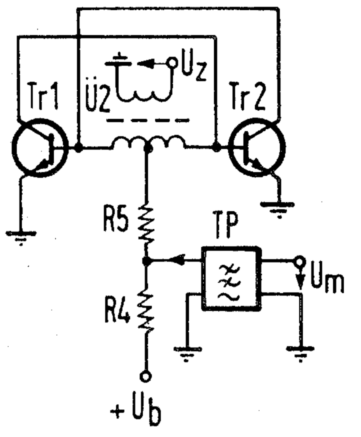
FIG. 2 illustrates a modification of the circuit of FIG. 1.

FIG. 2 illustrates an example of construction utilizing the invention, which is modified with respect to that of FIG. 1. Here, the inductance L according to FIG. 1 is supplemented by a further winding magnetically coupled with it, forming a transformer U2. Through this arrangement, the output transformer U1 according to FIG. 1 can be omitted. The end terminal of the primary winding of transformer U2 is, analogously to FIG. 1, connected between the base of collector electrodes of transistors Tr1 and Tr2, with the supply of the operating direct voltage +Ub for the transistors taking place over the series circuit of the resistors R4 and R5 and the center tap of the primary winding. The modulation voltage Um extends over the low pass TP, to the common connecting point of the series circuit comprising the two resistors R4 and R5. The multivibrator oscillation, modulated in frequency, is obtained at the secondary winding of the transformer U2. The series circuit of the two resistors R4 and R5 is included for the reason that, on the one hand, through the feed of the modulation voltage the center tap of the primary winding of the transformer U2 should not lie, in alternating current manner, on reference potential and, on the other hand, the operating direct voltage source must not short circuit the modulation voltage. Moreover, the resistances are included for the dimensioning of the currents of the transistors.

Figure 3:
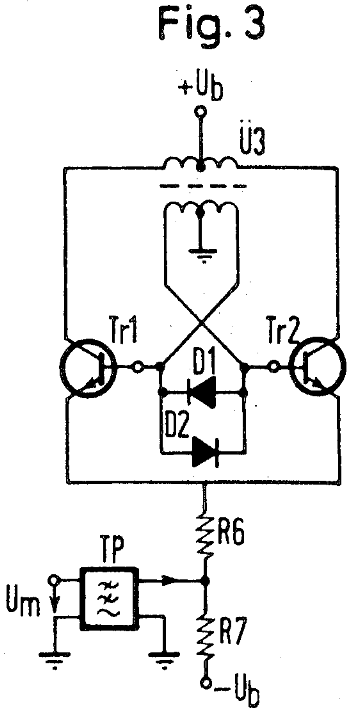
FIG. 3 illustrates a further modification of the circuit of FIG. 1.

Another advantageous embodiment of the invention, in which the limiting of the currents flowing in transistors Tr1 and Tr2 takes place, in a manner known per se, by additional means is represented in FIG. 3. The limiting means here consists of two rectifiers D1 and D2 which are oppositely connected in parallel between the base electrodes of transistors Tr1 and Tr2. In order to assure a faultless functioning of the transistors as current switches, it is expedient in this case to provide a direct-current manner of separation between the collector electrodes and the base electrodes. For this purpose the inductance L according to FIG. 1 is expanded into a transformer U3. The end terminals of the primary winding thereof connects the collector electrodes of the two transistors, while the secondary winding, having its end terminals interchanged with respect to the primary winding, connects the base electrodes thereof. Both windings of transformer U3 have a center tap, that of the primary winding serving for the supply of the operating direct voltage to the primary winding and that of the secondary winding being placed on reference potential. The feed of the modulation voltage now takes place from the emitter side of the transistors, with the emitter electrodes being connected over the series circuit of resistors R6 and R7, to a negative operating direct voltage −Ub, while the modulation voltage Um extends over the low pass Tp to the common connecting point of the resistors R6 and R7 and reference potential. The frequency modulated multivibrator oscillation can be obtained, for example, corresponding to the embodiments of FIGS. 1 and 2, on a third winding (not illustrated in FIG. 3) of the transformer U3. Instead of such third winding, however, an output transformer can be provided as a modulator output corresponding to the embodiment of FIG. 1, in which the end terminals of its primary winding are connected, over resistors, to the collector electrodes of the two transistors. It also is possible to dispense with a center tap of the primary winding.

Changes may be made within the scope and spirit of the appended claims which define what is believed to be new and desired to have protected by Letters Patent.

We claim as our invention:

1. A wide-band frequency modulator for installations, in electrical communications, particularly directional radio technology, comprising:
an astable multivibrator for the generation of the carrier oscillation,
said multivibrator comprising two amplifier elements having control and output electrodes,
the control and output electrodes of one amplifier element being directly cross-connected to the output and control electrodes of the other amplifier element to have the same phase therewith,
means for operatively applying an equal modulation voltage to each amplifier element,
a rechargeable storer, including an inductance operatively connecting the control electrodes of both amplifier elements,
said inductance having a negligible hysteresis, and
output means operatively connected with the output electrodes of said amplifier elements at which the modulated carrier frequency may be obtained.

2. A frequency modulator according to claim 1, wherein said means at which the modulated carrier may be obtained comprises an output transformer having a center-tapped primary winding, the output electrodes of the two amplifier elements being connected through respective resistances with the respective ends of such primary winding, the center tap of such winding being operatively connected through a further resistance with a direct voltage source providing the operating voltage for the amplifier elements, said transformer having a secondary winding at which the modulated carrier frequency may be obtained.

3. A frequency modulator according to claim 2, characterized by the feature that the output resistances of the respective amplifiers are so large that they are substantially determinative of the current flowing in the amplifier elements.

4. A frequency modulator according to claim 2 wherein the modulation voltage at the center tap of the primary winding of the output transformer is supplied over a low pass coupling device, and the electrodes common to the input and output circuits of the two amplifier elements are placed, at least in alternating-current manner, on reference potential.

5. A frequency modulator according to claim 1, wherein the amplifier elements are transistors.

6. An astable multivibrator comprising:
two amplifier means having their control and output electrodes cross-connected,
an inductance means as a rechargeable storer connected between the control electrodes of the two amplifier elements,
said inductance means having negligible inductivity and being substantially free of inductive coupling to other circuit elements,
one resistor coupled in circuit with each one of the said two amplifier elements and providing the principal impedance in the circuit for determining the current flow in the amplifier elements,
an output transformer is provided having its primary winding coupled across the output electrodes of said amplifier elements, said resistors being connected in series with the primary winding and the output electrodes, said primary winding having a center tap and means for connecting an operational direct voltage source to said center tap, wherein means are provided for coupling a substantially identical modulation voltage to the respective output electrodes of said amplifier means.